(12) United States Patent
Yoshimura

(10) Patent No.: US 6,747,432 B2
(45) Date of Patent: Jun. 8, 2004

(54) DRIVE APPARATUS FOR COOLING FAN MOTOR FOR USE IN VEHICLE

(75) Inventor: Satoshi Yoshimura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/351,310

(22) Filed: Jan. 27, 2003

(65) Prior Publication Data

US 2003/0140643 A1 Jul. 31, 2003

(30) Foreign Application Priority Data

Jan. 31, 2002 (JP) ........................... 2002-023983

(51) Int. Cl.⁷ ............................................. G05B 11/28
(52) U.S. Cl. ............................. 318/599; 318/811
(58) Field of Search ..................... 62/184, 428, 244; 165/42, 43; 318/599, 800, 801, 811

(56) References Cited

U.S. PATENT DOCUMENTS

| | | | | |
|---|---|---|---|---|
| 3,666,002 A | * | 5/1972 | Ferdelman | 165/260 |
| 3,890,798 A | * | 6/1975 | Fujimoto et al. | 62/155 |
| 4,590,772 A | | 5/1986 | Nose et al. | |
| 4,590,892 A | | 5/1986 | Nose et al. | |
| 4,658,595 A | * | 4/1987 | Shimada et al. | 62/179 |
| 4,765,284 A | * | 8/1988 | Kanazawa et al. | 123/41.49 |
| 6,367,273 B2 | * | 4/2002 | Takagi et al. | 62/230 |
| 6,512,346 B2 | * | 1/2003 | Yoshimura | 318/599 |
| 6,545,438 B1 | * | 4/2003 | Mays, II | 318/254 |
| 6,593,717 B2 | * | 7/2003 | Yoshimura | 318/471 |
| 6,603,277 B2 | * | 8/2003 | Yoshimura | 318/139 |
| 6,650,074 B1 | * | 11/2003 | Vyssotski et al. | 318/254 |
| 2002/0014873 A1 | | 2/2002 | Yoshimura | |
| 2002/0043946 A1 | | 4/2002 | Yoshimura | |

FOREIGN PATENT DOCUMENTS

| | | | |
|---|---|---|---|
| JP | 56-81114 | | 11/1979 |
| JP | 60-78822 | | 5/1985 |
| JP | 60-78823 | | 5/1985 |
| JP | 5-310176 | | 11/1993 |
| JP | 8-111902 | | 4/1996 |
| JP | 8-256404 | | 10/1996 |
| JP | 2000097026 A | * | 4/2000 |

* cited by examiner

*Primary Examiner*—William E. Tapoloai
*Assistant Examiner*—Mohammad M. Ali
(74) *Attorney, Agent, or Firm*—Posz & Bethards, PLC

(57) ABSTRACT

A cooling fan motor drive apparatus for use in vehicle is equipped with first to fourth semiconductor switches for driving first and second cooling fan motors upon receipt of a power supply voltage through power supply lines. A control unit implements control on openings and closures of the first to fourth switches to establish first and second power supply systems between first and second power supply lines for performing serial and parallel operations of the first and second cooling fan motors. The control unit closes the second and fourth semiconductor switches when the first and second cooling fan motors are driven in series and closes the first, second and third semiconductor switches when the first and second cooling fan motors are drive in parallel. When an overcurrent flows in the cooling fan motors, the control unit conducts the serial operation of the cooling fan motors irrespective of an operation command signal, and at the start-up of the drive apparatus, the control unit conducts the serial operation thereof for a predetermined time period. This drive apparatus can be located in the vicinity of the cooling fan motors and, even if an abnormal condition occurs temporarily, can restore to a normal condition after the recovery.

14 Claims, 14 Drawing Sheets

FIG. 3

| BATTERY VOLTAGE VB1 AT 21g | BATTERY VOLTAGE VB2 AT 21e | COMMAND SIGNAL Sb | TRANSISTOR 36 | TRANSISTOR 37 | TRANSISTOR 38 | TRANSISTOR 39 | FAN OPERATION STATES |
|---|---|---|---|---|---|---|---|
| VB1<8V | | DON'T CARE | OFF | OFF | OFF | OFF | STOP |
| 8V≦VB1≦16V | 0V≦VB2≦16V | 0V | OFF | OFF | OFF | OFF | STOP |
| | | 250Hz, 50% DUTY PULSE | OFF | ON | OFF | ON | SERIAL |
| | | 5V | ON | ON | ON | OFF | PARALLEL |

CURRENT-EXCESS SIGNAL Sk=L

FIG. 9

| COMMAND SIGNAL Sn | BATTERY VOLTAGE VB1 AT 21g | BATTERY VOLTAGE VB2 AT 21e | COMMAND SIGNAL Sb | TRAN-SISTOR 36 | TRAN-SISTOR 37 | TRAN-SISTOR 38 | TRAN-SISTOR 39 | FAN OPERATION STATES |
|---|---|---|---|---|---|---|---|---|
| 0V | VB1<8V | 0V≤VB2≤16V | DON'T CARE | OFF | OFF | OFF | OFF | STOP |
| 0V | 8V≤VB1≤16V | 0V≤VB2≤16V | 0V | OFF | OFF | OFF | OFF | STOP |
| 0V | 8V≤VB1≤16V | 0V≤VB2≤16V | 250Hz, 50% DUTY PULSE | OFF | ON | OFF | ON | SERIAL |
| 0V | 8V≤VB1≤16V | 0V≤VB2≤16V | 5V | ON | ON | ON | OFF | PARALLEL |
| 5V | VB1<8V | 0V≤VB2≤16V | DON'T CARE | OFF | OFF | OFF | OFF | STOP |
| 5V | 8V≤VB1≤16V | 0V≤VB2≤16V | 0V | OFF | OFF | OFF | ON | GENERATION |
| 5V | 8V≤VB1≤16V | 0V≤VB2≤16V | 250Hz, 50% DUTY PULSE | OFF | ON | OFF | ON | SERIAL |
| 5V | 8V≤VB1≤16V | 0V≤VB2≤16V | 5V | ON | ON | ON | OFF | PARALLEL |

CURRENT-EXCESS SIGNAL Sk=L

FIG. 13
(PRIOR ART)

| MAGNET CLUTCH (SW 14) | AIR-CON. SW 11 | WATER-TEMP. SW 10 | RELAY SW 6b | RELAY SW 7b | RELAY SW 8b | FAN OPERATION STATES |
|---|---|---|---|---|---|---|
| OFF | OFF | OFF | OFF | (b) | OFF | STOP |
| ON | OFF | OFF | ON | (b) | OFF | SERIAL |
| OFF | OFF | ON | ON | | | |
| ON | ON | OFF | | (a) | ON | PARALLEL |
| ON | ON | ON | | | | |

DRIVE APPARATUS FOR COOLING FAN MOTOR FOR USE IN VEHICLE

BACKGROUND OF THE INVENTION

1) Field of the Invention

The present invention relates to a cooling fan motor drive apparatus for vehicles, which is made to drive vehicle cooling fan motors upon receipt of a power supply voltage through a power supply line.

2) Description of the Related Art

In a vehicle (such as a car), there is provided a cooling fan for cooling a radiator of an engine and condenser of an air conditioner, and so far, such a cooling fan has been rotationally driven by a motor (for example, DC motor). FIG. 12 is an illustration of an electrical arrangement of a drive apparatus designed to drive two cooling fan motors in series/in parallel. In FIG. 12, a drive apparatus 1 employs a mainstream approach, made to drive cooling fan motors 2 and 3 in series or in parallel through the use of three relays according to cooling capability needed.

That is, a power supply line 4 is connected through an ignition switch (not shown) to a positive-side terminal of a battery, and one terminal of each of exciting coils 6a, 7a and 8a of the relays 6, 7 and 8 is connected through a fuse 9 to the power supply line 4. The other terminal of each of the exciting coils 7a and 8a is connected to the ground 12 through a water temperature switch 10 and an air conditioner high-pressure switch 11 placed in parallel with each other. Moreover, the other terminal of the exciting coil 6a is connected through an air conditioner amplifier 13 having an equivalent circuit illustrated and a switch 14 to the ground 12, and further connected through the air conditioner 13 to the water temperature switch 10 and the air conditioner high-pressure switch 11. To the air conditioner amplifier 13, a battery voltage is supplied from the power supply line 4 through a fuse 15, and the switch 14 takes a make-and-break action in conjunction with a magnet clutch (not shown).

Between a power supply line 16 connected directly to the positive-side terminal of the battery 5 and the ground 12, there are formed a series circuit comprising a fuse 17, a relay switch 6b, a cooling fan motor 2 and a relay switch 7b (at the on-condition of the normally-open contact) and a series circuit comprising a fuse 18, a relay switch 8b and a cooling fan motor 3. The normally-closed contact of the relay switch 7b is connected to the cooling fan motor 2.

In this drive apparatus 1, the operations of the cooling fan motors 2 and 3 in the states of the water temperature switch 10, the air conditioner high-pressure switch 11 and the switch 14 (magnet clutch) are as shown in FIG. 13. That is, the cooling fan motors 2 and 3 come to a stop when all the switches are in the off-condition, while they are drive in series when the switch is in the on-state and the air conditioner high-pressure switch 11 and the switch 14 are in the off-state, and driven in parallel when the water temperature switch 10 or the air conditioner high-pressure switch 11 is in the on-state.

The cooling fan motors 2 and 3 are located close to a condenser and radiator existing in the front part of a vehicle, and for simplifying the handling of a harness with respect to the cooling fan motors 2 and 3 and for reducing the loss in the harness, it is desirable that the drive apparatus is put in the vicinity of the cooling fan motors 2 and 3. However, since the front part of a vehicle is exposed to bad environments because of being dashed with liquid or dust by the running of the vehicle, for installing the drive apparatus 1 therein, there is a need to place the relays 6, 7 and 8 constituting the drive apparatus 1 in a dedicated relay box and reinforce the sealing structure. However, since the reinforcement of the sealing structure is costly, in the present circumstance the drive apparatus 1 is required to be located at a position (for example, the rear surface side of the engine room) remote from the cooling fan motors 2 and 3 and exposed to less liquid and dust.

In addition, since the drive apparatus 1 is composed of the fuses 9, 15, 17, 18 and the relays 6, 7, 8, for example, if the one cooling fan motor 2 is locked during the driving of the vehicle, the fuse 17 is fused so that the cooling fan motors 2 and 3 can be driven only when the fuse 17 is replaced with new one. Accordingly, once the motor lock occurs, difficulty is experienced in operating the cooling fan motors 2 and 3 even if it is released therefrom. Still additionally, in high-temperature and high-pressure conditions, only the other cooling fan motor 3 is driven to produce the lack of cooling capability, thus readily causing the overheating or the lowering of the performance of the air conditioner.

SUMMARY OF THE INVENTION

The present invention has been developed in consideration of the above-mentioned situations, and it is therefore an object of the invention to provide a cooling fan motor drive apparatus for use in a vehicle, capable of being placed close to vehicle cooling fan motors and, even if the cooling fan motor falls temporarily into an abnormal condition, capable of being restored to its normal condition after the recovery thereof.

For this purpose, according to the present invention, in a cooling fan motor drive apparatus for use in a vehicle which drives cooling fan motors upon receipt of a power supply voltage through a power supply line, first to fourth semiconductor switches are provided, and control means closes the second and fourth semiconductor switches to establish a current-carrying path extending from a first power supply line through the second semiconductor switch, a second vehicle cooling fan motor, the fourth semiconductor switch and a first vehicle cooling fan motor to a second power supply line so that the first and second vehicle cooling fan motors are driven in series, while the control means closes the first, second and third semiconductor switches to establish a current-carrying path extending from the first power supply line through the first semiconductor switch and the first vehicle cooling fan motor to the second power supply line and a current-carrying path extending from the first power supply line through the second semiconductor switch, the second vehicle cooling fan motor and the third semiconductor switch to the second power supply line so that the first and second vehicle cooling fan motors are driven in parallel.

As mentioned above, this drive apparatus is designed to switch the vehicle cooling fan motors between the serial and parallel operations and, hence, the semiconductor switches are easily configured into a sealed condition by means of resin molding or the like and the size reduction is further attainable in comparison with the conventional construction using relays. This enables the drive apparatus to be located in the vicinity of the cooling fan motors where the mounting space is difficult to secure and much dashed liquid and dust exist, which simplifies the handling of the harness with respect to the cooling fan motors and reduces the loss in the harness. Moreover, the employment of the semiconductor switches prevents damages and permits protection from overload, protection from overcurrent and protection from malfunction due to noises, and even if the cooling fan motor falls temporarily into an abnormal condition, it can be restored to a normal operation after the recovery from the abnormal condition.

In addition, in the drive apparatus according to the present invention, a reference current is set in accordance with a serial or parallel operation condition, and when a current flowing in the cooling fan motor exceeds the reference current, an output of a current-excess signal takes place. There is a situation that the operation of the cooling fan motor is required to be maintained to the utmost and it is undesirable that the operation thereof comes to a stop during the parallel operation which particularly requires a high cooling capability. Still additionally, considering the case that abnormality, for example, locking, occurs in the cooling fan motor, when the parallel operation is conducted, all the power supply voltage is applied to a motor resistor so that there is a possibility that an extremely large current flows, while at the serial operation the cooling fan motor taking an non-locked condition undertakes the power supply voltage so that the current is relatively suppressible. Therefore, when the switching from the parallel operation to the serial operation is made provided that a current-excess signal is outputted at the parallel operation, it is possible to continue the cooling while maintaining the cooling capability to some extent even in the case of the occurrence of abnormality.

Moreover, in the drive apparatus according to the present invention, when a current detection signal continues for over a predetermined time period and exceeds a current reference signal, a current-excess signal is outputted to make the switching from the parallel operation to the serial operation. This prevents the actually unnecessary switching to the serial operation from being made in a case in which an excessive rush current flows temporarily due to the switching from the serial operation to the parallel operation or in a case in which an erroneous current-excess signal is outputted due to noises or the like, thus achieving stable operations.

Still moreover, in the drive apparatus according to the present invention, the switching to the serial/parallel operation condition before the output of the current-excess signal is made provided that the output of the current-excess signal comes to a stop, which secures the cooling capability to the utmost in the case of a high cooling capability being required.

Furthermore, in the drive apparatus according to the present invention, when the current detection signal continues for over a predetermined time period and does not exceed the current reference signal, the output of the current-excess signal is stopped and the switching to the serial/parallel operation condition before the output of the current-excess signal is made, thereby preventing the hunting phenomenon that the serial operation and the parallel operation are frequently conducted repeatedly.

Still furthermore, in the drive apparatus according to the present invention, the control means conducts the serial operation only for a predetermined time period at the start-up irrespective of a selection command for the serial/parallel operation to produce speed electromotive forces in the first and second cooling fan motors and then makes the switching to the parallel operation according to the selection command, thus reducing the rush current at the start-up in comparison with the start-up in the parallel condition.

In addition, in the drive apparatus according to the present invention, reflux means is connected to the first to fourth semiconductor switches in parallel, thus suppressing the occurrence of the surge voltage occurring at the switching of the semiconductor switch from the on-condition to the off-condition.

Still additionally, in the drive apparatus according to the present invention, in a case in which a rotational force is given to the cooling fan motor while it catches wind, for example, in a state where the vehicle is running and the power supply voltage drops below a predetermined voltage, when the control means opens the first to third semiconductor switches and closes the fourth semiconductor switch so that a current flows through a path extending from the second power supply line through the first cooling fan motor, the fourth semiconductor switch, the second cooling fan motor and the reflux means connected in parallel with the second semiconductor switch to the first power supply line to accomplish the regeneration of power on the power supply line side. This improves the power balance.

BRIEF DESCRIPTION OF THE DRAWINGS

Other objects and features of the present invention will become more readily apparent from the following detailed description of the preferred embodiments taken in conjunction with the accompanying drawings in which:

FIG. 3 is an illustration of an on/off state of a MOS transistor and an operating state of a fan motor when a current-excess signal Sk shows an L level;

FIG. 9 is an illustration of an on/off state of a MOS transistor and an operating state of a fan motor when a current-excess signal Sk shows an L level;

FIG. 13 is an illustration of an operation of a cooling fan motor at respective states of switches of the drive apparatus shown in FIG. 12.

DESCRIPTION OF THE PREFERRED EMBODIMENTS (First Embodiment)

Referring to FIGS. 1 to 5, a description will be given hereinbelow of a first embodiment of the present invention.

Figure 1:
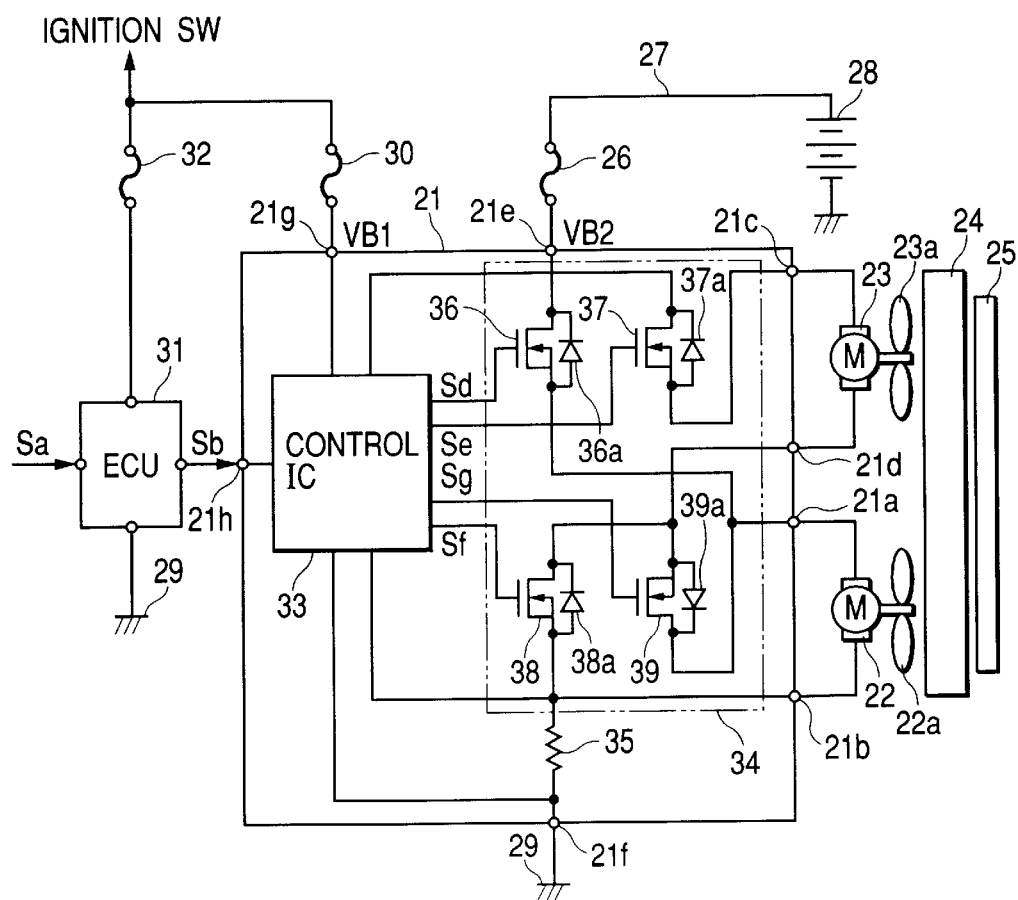
FIG. 1 is an illustration of electric arrangements of a drive apparatus according to a first embodiment of the present invention and peripheral devices.

FIG. 1 is an illustration of electric arrangements of a drive apparatus for a cooling fan motor for use in a vehicle, and peripheral devices. In FIG. 1, designated at reference numeral 21 is a drive apparatus according to the first embodiment, and first and second vehicle cooling fan motors (each of which will be referred to hereinafter as a "fan motor") 22 and 23 to be driven by the drive apparatus 21 are DC motors which are for driving cooling fans 22a and 23a to cool an radiator 24 of an engine and a condenser 25 of an air conditioner located in a front part of a vehicle.

The drive apparatus 21 is placed in the vicinity of the fan motors 22 and 23 in a state resin-molded and dustproof/waterproof-sealed, and the fan motors 22 and 23 are connected between terminals 21a and 21b of the drive apparatus 21 and between terminals 21c and 21d thereof. A power supply terminal 21e of the drive apparatus 21 is connected through a power supply line 27 (corresponding to a first power supply line) with a fuse 26 to the positive-side terminal of a battery 28, while a power supply terminal 21f thereof is connected to the negative-side terminal of the battery 28 and further to the ground or earth 29 (corresponding to a second power supply line), thereby supplying a battery voltage VB2 to between the power supply terminals 21e and 21f at all times.

A control power supply terminal 21g is connected through a fuse 30 and an ignition switch (not shown) to the positive-side terminal of the battery 28. Therefore, between the power supply terminals 21g and 21f, the battery voltage VB1 is supplied only for the time period of the closure of the ignition switch. The fuses 26 and 30 to be used in this arrangement are not for protecting the drive apparatus 21 from motor locking, motor overload or the like, but for, when the drive apparatus 21 itself falls into troubles or faults, such as short-circuit of semiconductor switches, preventing the enlargement of the troubles.

The engine control ECU (Electronic Control Unit) 31 is made to receive an air conditioner operation signal Sa from an air conditioner ECU (not shown) to produce an operation command signal Sb for the fan motors 22 and 23 on the basis of the operation signal Sa, a temperature of engine coolant (cooling water) and others. This operation command signal Sb is given to a terminal 21h of the drive apparatus 21. The ECU 31 operates on the battery voltage VB1 supplied through the ignition switch and the fuse 32.

The drive circuit 21 is constructed in the form of a hybrid IC composed of a control IC 33 (corresponding to control means), a switching circuit 34 (corresponding to current-carrying path switching means) and a current detection resistor 35 (corresponding to current detecting means). Of these, the switching circuit 34 is made up of N-channel power MOS transistors 36 to 39 (first to fourth semiconductor switches) which function as switch means, and between the drain and source of each of these MOS transistors 36 to 39, the corresponding one of diodes 36a to 39a (parasitic diodes built in the MOS transistors 36 to 39) is connected, which uses the drain side as cathode and functions as reflux means.

That is, the drains and sources of the MOS transistors 36, 37, 38 and 39 are connected between the terminals 21e and 21a, between the terminals 21e and 21c, between the terminals 21d and 21b and between the terminals 21a and 21d, respectively. The terminal 21b is connected through the resistor 35 to the terminal 21f.

Figure 2:
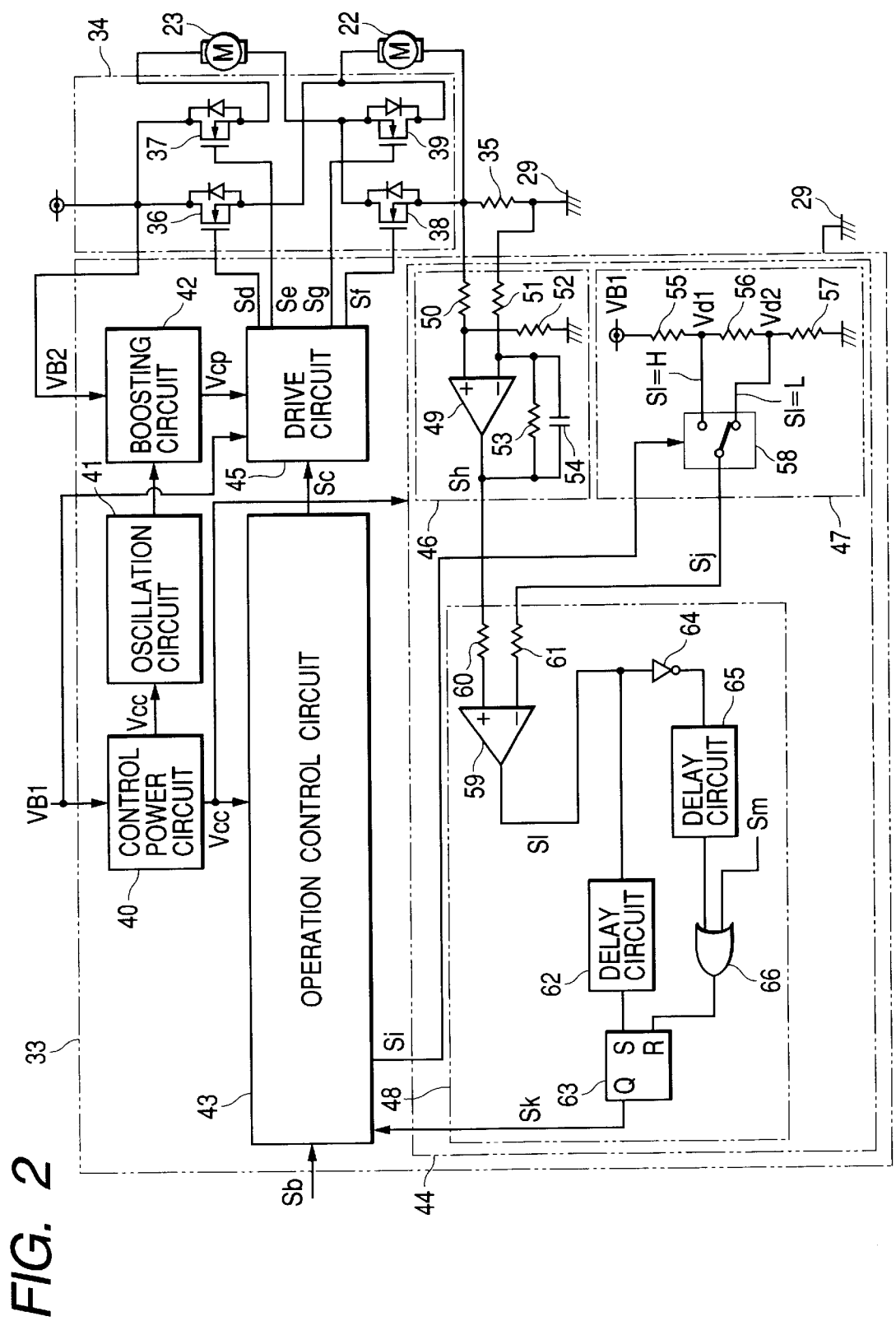
FIG. 2 is an illustration of an electric arrangement of the drive apparatus, showing a concrete circuit arrangement of a control IC.

Secondly, referring to FIG. 2, a description will be given hereinbelow of an electric arrangement of the control IC 33. In FIG. 2, the peripheral circuits of the drive apparatus 21 are omitted except the fan motors 22 and 23.

The control IC 33 is made up of a control power supply circuit 40, an oscillation circuit 41, a boosting circuit 42, an operation control circuit 43 (corresponding to operation switching means), an overcurrent detection circuit 44 and a drive circuit 45. In this configuration, the control power supply circuit 40 is a series regulator for generating a control power supply voltage Vcc (for example, 5V) from the battery voltage VB1 supplied through the ignition switch, with the control power supply voltage Vcc being fed to the oscillation circuit 41, the operation control circuit 43 and the overcurrent detection circuit 44.

The oscillator circuit 41 is for generating a pulse signal with a predetermined frequency, and the boosting circuit 42 is a charge pump circuit for generating a step-up voltage Vcp of approximately 24V from a battery voltage VB2 (for example, 14V) through the use of the pulse signal. The drive circuit 45 is for outputting drive signals Sd to Sg to the MOS transistors 36 to 39, respectively, on the basis of an operation signal Sc (described later) inputted from the operation control circuit 43. These drive signals Sd to Sg are produced using the step-up voltage Vcp and are a high voltage enough to turn on the MOS transistors 36 to 39. However, in a case in which the MOS transistors 36 to 39 is of a P-channel type, the boosting circuit 42 becomes unnecessary. Moreover, it is also acceptable that, for the drive signals Sg and Sf, the battery voltage VB1 is used in place of the step-up voltage Vcp.

The overcurrent detection circuit 44 is composed of a differential amplification circuit 46, a reference voltage setting circuit 47 (corresponding to reference setting means) and a comparison circuit 48 (corresponding to comparing means). The differential amplification circuit 46 makes differential amplification on a voltage across the resistor 35 developing in proportion to currents (motor current) flowing in the fan motors 22 and 23, and outputs the amplified voltage as a current detection signal Sh. It is composed of an operational amplifier 49, resistors 50 to 53 and a capacitor 54. Owing to the employment of the capacitor 54, the differential amplification circuit 46 also function as a low-pass filter to remove noises superimposed on the voltage across the resistor 35.

The reference voltage setting circuit 47 is for outputting a current reference signal Sj having a voltage value corresponding to a reference current in accordance with a switching signal Si given from the operation control circuit 43 in conjunction with a serial/parallel operation state. Concretely, the reference voltage setting circuit 47 generates divided voltages Vd1 and Vd2 of the battery voltage VB1 through the use of resistors 55, 56 and 57 connected in series, and when the switching signal Si is at the H (High) level (parallel operation), outputs the divided voltage Vd1 through a switching circuit 58, while, when the switching signal Si is at the L (Low) level (serial operation), outputting the divided voltage Vd2 through the switching circuit 58.

The comparison circuit 48 compares a current detection signal Sh with a current reference signal Sj to output a current-excess signal Sk to the operation control circuit 43. An non-inverting input terminal of a comparator 59 is connected through a resistor 60 to an output terminal of the operational amplifier 49 while an inverting input terminal thereof is connected through a resistor 61 to the switching circuit 58. An output terminal of the comparator 59 outputting a comparison signal Sl is connected through a delay circuit 62 to a set terminal S of an R-S flip flop 63 and further connected through an inverter 64, a delay circuit 65 and an OR gate 66 to a reset terminal R of the R-S flip flop 63. An output terminal Q of the R-S flip flop 63 outputs the above-mentioned current-excess signal Sk.

The delay circuit 62 is made to switch an output signal from the L level to the H level when the inputted comparison signal Sl turns from the L level to the H level and this H level continues for a time period T1. Likewise, the delay circuit 65 switches an output signal from the L level to the H level when the inverted signal of the inputted comparison signal turns from L level to the H level and this H level continues for a time period T2. In this connection, the aforesaid OR gate 66 is made to receive a reset signal Sm which turns temporarily to the H level when the ignition switch is turned on.

The operation control circuit 43 is made to determine the operating conditions of the fan motors 22 and 23, i.e., stop, serial operation and parallel operation thereof, on the basis of the operation command signal Sb inputted from the ECU 31, the current-excess signal Sk inputted from the overcurrent detection circuit 44 and the battery voltage VB1 detected by a power supply voltage monitoring circuit (not shown). Moreover, the operation control circuit 43 outputs an operation signal Sc representative of the operation condition determined, and outputs a switching signal Si corresponding to the operation condition.

Furthermore, the operations of the drive apparatus 21 according to this embodiment will be described hereinbelow with reference to FIGS. 3 to 5.

FIG. 3 is an illustration of on/off states of the MOS transistors 36 to 39 in a case in which the current-excess signal Sk assumes the L level, and the operating conditions of the fan motors 22 and 23. The operation control circuit 43 sets the operation signal Sc to "stop" when the control battery voltage VB1 is lower than 8V and the operation command signal Sb is constant at 0V, and the drive circuit 45 turns off all the MOS transistors 36 to 39, so the fan motors 22 and 23 come into the non-energized conditions and the cooling fans 22a and 23a stop if receiving no external force such as wind.

On the other hand, in a case in which the battery voltage VB1 is in a normal voltage range, i.e., equal to or higher than 8V and equal to or lower than 16V, the operation control circuit 43 sets the operation signal Sc to "serial operation" when the operation command signal Sb is a 250 Hz, 50% duty pulse signal, and sets the operation signal Sc to "parallel operation" when the operation command signal Sb is constant at 5V. In the case of the "serial operation", the drive circuit 45 sets drive signals Se and Sg at the step-up voltage Vcp and turns on the MOS transistors 37 and 39. At this time, a current-carrying path develops, which extends from the terminal 21e through the MOS transistor 37, the fan motor 23, the MOS transistor 39, the fan motor 22 and the resistor 35 to the terminal 21f, so that the fan motors 22 and 23 come into the serial operation condition.

Furthermore, in the case of the "parallel operation", the drive circuit 45 sets the drive signals Sd, Se and Sf at the step-up voltage Vcp and turns on the MOS transistors 36, 37 and 38. At this time, a current-carrying path comes out, which extends from the terminal 21e through the MOS transistor 36, the fan motor 22 and the resistor 35 to the terminal 21f, and a current-carrying paths develops, which extends from the terminal 21e through the MOS transistor 37, the fan motor 23, the MOS transistor 38 and the resistor 35 to the terminal 21f, thereby operating the fan motors 22 and 23 in parallel. In either case, all the current flowing through the fan motors 22 and 23 passes through the resistor 35. In this connection, at the switching among the operating conditions, the currents flowing due to the speed electromotive forces of the fan motors 22 and 23 are refluxed to the diodes 36a to 39a, thereby suppressing the occurrence of the surge currents.

Still furthermore, a description will be given hereinbelow of an operation to be conducted in a case in which an overcurrent flows.

Figure 4:
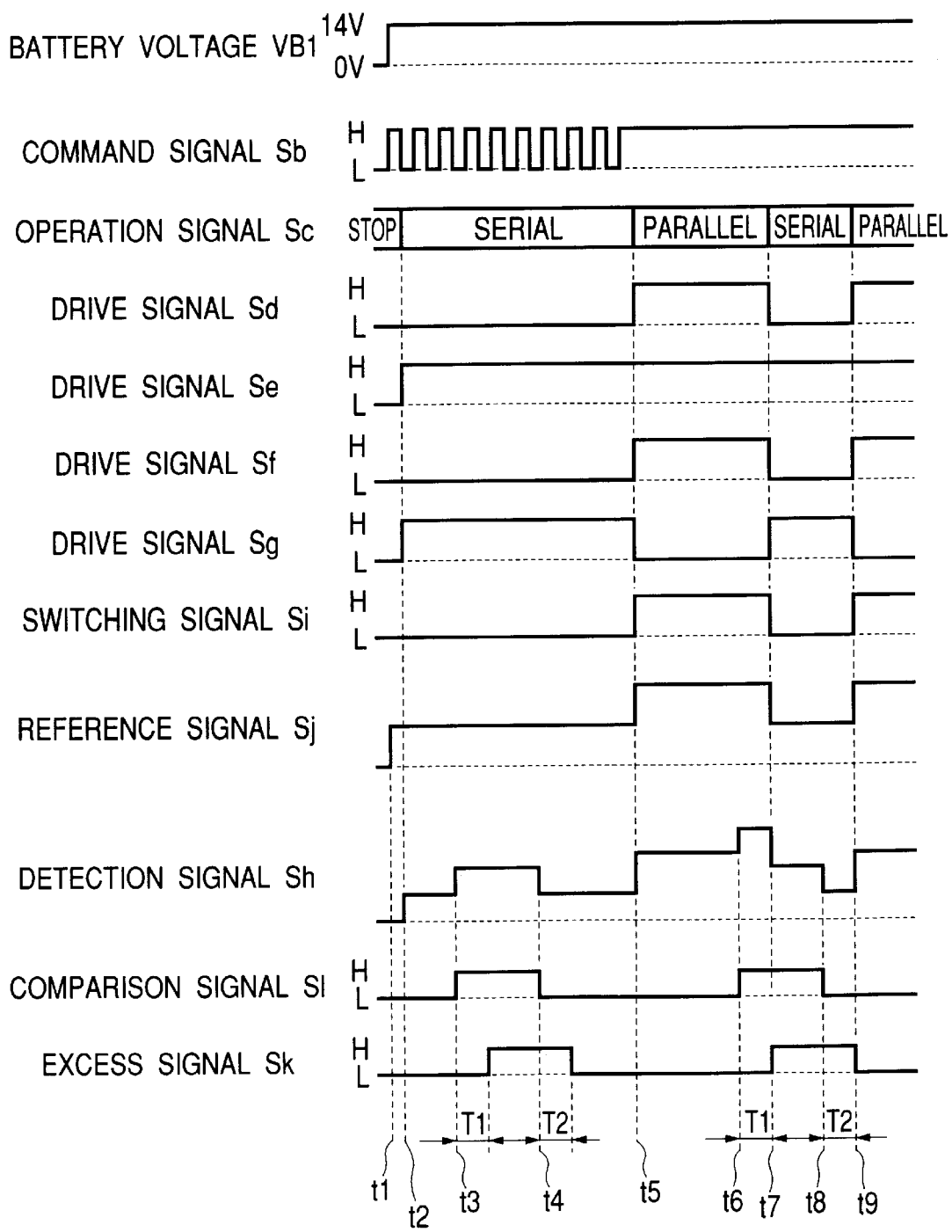
FIG. 4 is a timing chart of serial/parallel operations.
Figure 5:
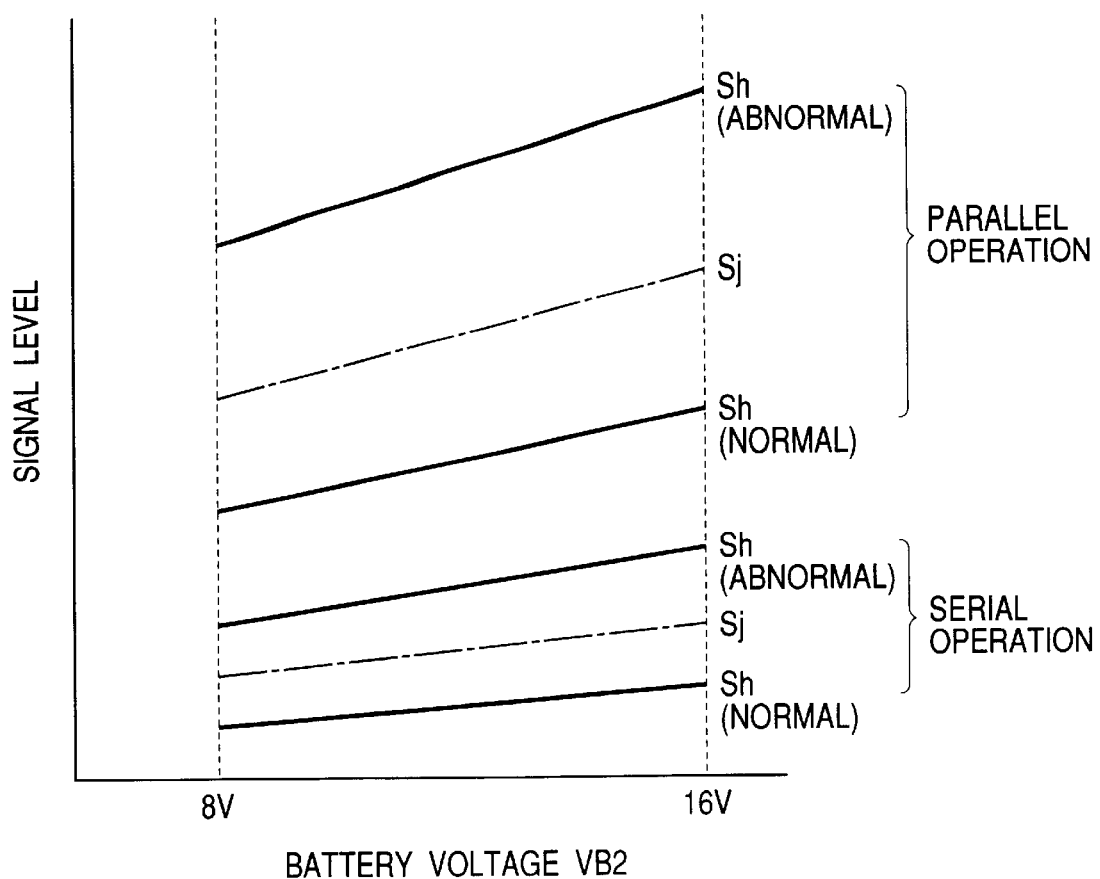
FIG. 5 is an illustration of a current detection signal Sh and a current reference signal Sj in normal and abnormal conditions.

In a timing charge of FIG. 4, when the ignition switch is turned on at the time t1, a reset signal Sm is inputted to the OR gate 66 and a current-excess signal Sk is reset to the L level. Under the condition that the temperature of the coolant is low and the compressor pressure of the air conditioner is low, the ECU 31 outputs an operation command signal Sb comprising a pulse signal. In this case, the operation control circuit 43 sets an operation signal Sc to "serial operation" in accordance with the operation command signal Sb and sets a switching signal Si at the L level, whereby the fan motors 22 and 23 are driven in a serially operating condition, and a current reference signal Sj for the serial operation is set by the switching circuit 58. Incidentally, although not shown in FIG. 4, at the start-up, there arises that a rush current occurs so that a current detection signal Sh increases temporarily.

For the period from the time t2 to the time t3, the fan motors 22 and 23 rotate normally, and the cooling of the radiator 24 and the condenser 25 takes place with a relatively low cooling capability. In this case, the current detection signal Sh corresponding to the detection current is lower than the current reference signal Sj corresponding to a reference current, and a comparison signal Sl and a current-excess signal Sk turn to the L level.

On the other hand, assuming that the fan motor 22 stops (locked) for the period from the time t3 to the time t4, the motor current increases so that the current detection signal Sh exceeds the current reference signal Sj. FIG. 5 is an illustration of the magnitudes of the current detection signal Sh with respect to the current reference signal Sj at the battery voltage VB2 in the normal and abnormal (motor-locked) conditions. Because Sh>Sj, the comparison signal Sl switches from the L level to the H level, and owing to the effect of the delay circuit 62, the current-excess signal Sk also turns to the H level after the delay of a time period T1 with respect to the time t3.

However, since the fan motor 23 rotating normally accepts the battery voltage VB2, the motor current does not exceed the possible maximum current value flowing through the fan motor 23 and the MOS transistors 37 and 39. Therefore, the operation control circuit 43 continues the serial operation in this state. When the fan motor 22 is released from the locked condition at the time t4, the comparison signal Sl becomes the L level, and owing the effect of the delay circuit 65, the current-excess signal Sk also returns to the L level after the delay of a time period T2.

Following this, at the time t5, when a water temperature switch indicative of a rise of the coolant temperature turns on or when a high-pressure switch representative of a rise of the compressor pressure turns on, the ECU 31 outputs an operation command signal Sb constant at 5V. The operation control circuit 43 sets the operation signal Sc to "parallel operation" in accordance with the operation command signal Sb and, at the same time, changes the switching signal Si to the H level. In this way, the fan motors 22 and 23 are switched into the parallel operation condition, and the current reference signal Sj for the parallel operation is set by the switching circuit 58. Incidentally, although not shown in FIG. 4, at the switching, a rush current can occur to temporarily increase the current detection signal Sh.

For the period from the time t5 to the time t6, the fan motors 22 and 23 rotate normally and the radiator 24 and the condenser 25 are cooled with a relative high cooling capability. In this case, the current detection signal Sh is lower than the current reference signal Sj, and the comparison signal Sl and the current-excess signal Sk turn to the L level.

On the other hand, assuming that the fan motor 22 comes to a stop (locked) for the period from the time t6 to the time t8, the motor current increases so that the current detection signal Sh becomes larger than the current reference signal Sj. Thus, the comparison signal Sl switches from the L level to the H level, and owing to the effect of the delay circuit 62, the current-excess signal Sk turns to the H level at the time t7 after the delay of the time period T1 from the time t6.

When the current-excess signal Sk becomes the H level during the parallel operation, the operation control circuit 43 makes the switching to the serial operation regardless of the operation command signal Sb to continue the cooling by the cooling fan 23a. This is because of the protection of the fan motor 22 and the drive apparatus 21 from an excessive current. That is, if the fan motor 22 falls into a motor-locked condition during the parallel operation, a motor current approximate to the aforesaid maximum current value flows unlike the case of the serial operation.

Following this, when the fan motor 22 is released from the locked condition at the time t8, the comparison signal Sl turns to the L level, and owing to the operation of the delay circuit 65, the current-excess signal Sk returns to the L level at the time t9 after the delay of the time period T2 therefrom. When the current-excess signal Sk becomes the L level, the operation control circuit 43 resumes the parallel operation in accordance with the operation command signal Sb. Incidentally, although the above description relates to the case of the fan motor 22 falling into a locked condition, a similar operation is conducted also in a case in which the fan motor 23 falls into a locked condition.

As described above, since the drive apparatus 21 according to this embodiment is equipped with the switching circuit 34 whereby the two fan motors 22 and 23 can be driven in series and in parallel through the use of the combination of the MOS transistors 36 to 39, a sealing structure can easily be made by means of resin molding and the size reduction is feasible as compared with the conventional structure using relays, which enables the drive apparatus 21 to be located in the vicinity of the fan motors 22 and 23 (near the front part of a vehicle) hardly allowing the formation of a mounting space and dashed with liquid or dust and which simplifies the handling of a harness with respect to the fan motors 22 and 23 and reduces the loss in the harness.

To the MOS transistors 36 to 39, the reflux diodes 36a to 39a are connected, which suppresses the occurrence of a surge voltage. Moreover, the employment of the semiconductor switches enables overload protection, overcurrent protection and malfunction protection stemming from noises, due to non-breakdown, and even if an abnormal condition such as a motor-locked state occurs temporarily in the fan motors 22 and 23, the restoration to the normal condition is possible after the recovery from that abnormal condition.

When the current-excess signal Sk comes into the H level due to an overcurrent while the fan motors 22 and 23 are driven in parallel in order to provide a high cooling capacity, the drive apparatus 21 performs the switching from the parallel operation to the serial operation and, hence, can continue the cooling while securing the cooling capability in some degree even if an abnormality occurs. This can minimize the rise of coolant temperature or the drop of cooling performance.

In addition, since the current-excess signal Sk is switched to the H level to conduct the switching from the parallel operation to the serial operation when the current detection signal Sh continuously exceeds the current reference signal Sj for over the time period T1, it is possible to prevent the switching to the serial operation due to the occurrence of temporary overcurrent or noise originating from the switching to the parallel operation, thus achieving the stabilization of the operations. Still additionally, when the current detection signal Sh does not reach the current reference signal Sj for over the time period T2, the current-excess signal Sk turns to the L level to perform the switching from the serial operation to an operation according to the operation command signal Sb, thus preventing the hunting phenomenon that the serial operation and the parallel operation are repeatedly conducted at frequent intervals.

(Second Embodiment)

Secondly, referring to FIGS. 6 and 7, a description will be given hereinbelow of a second embodiment of the present invention. A drive apparatus according to this embodiment features that a start processing circuit is added to the operation control circuit 43 in order to reduce the motor rush current at the start-up.

Figure 6:
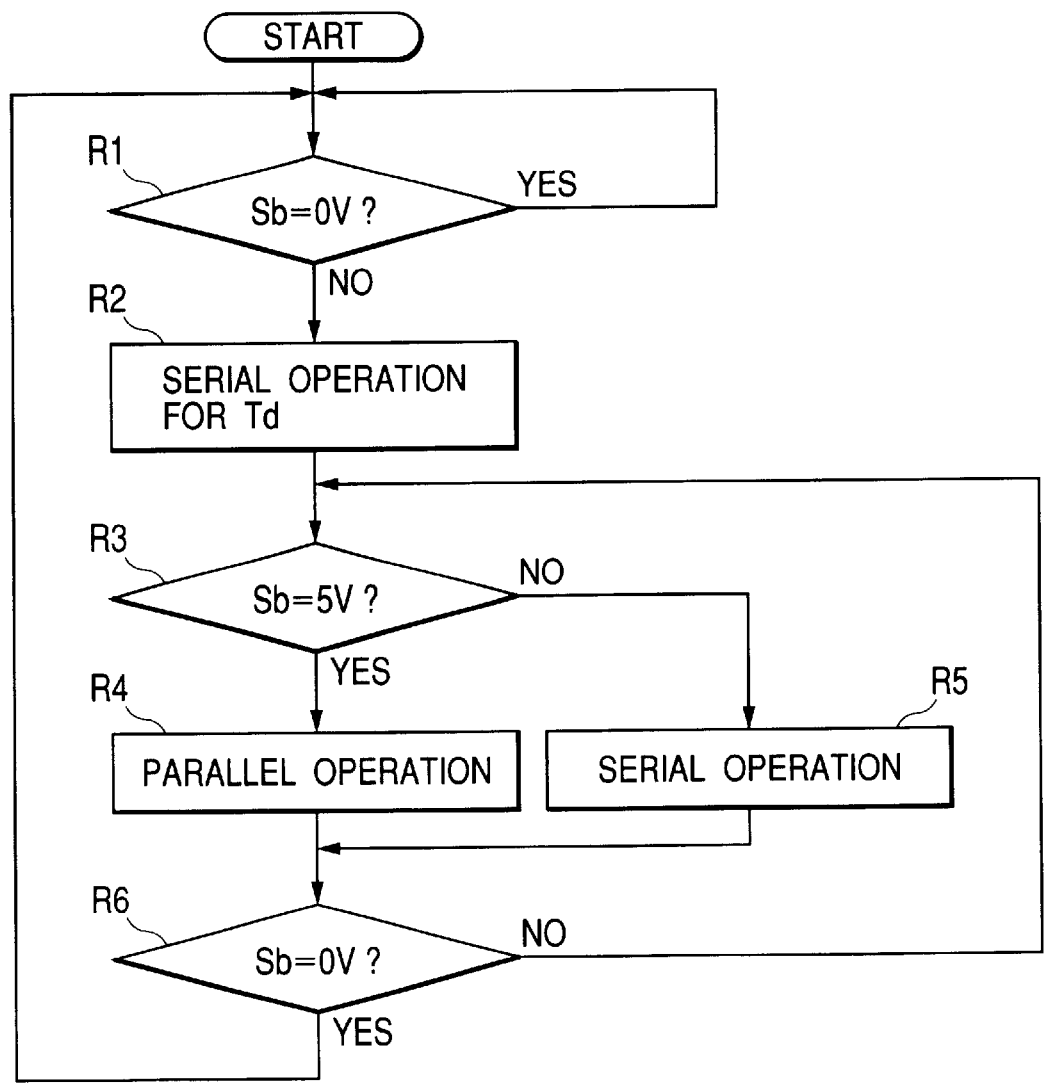
FIG. 6 is a flow chart showing an operation of an operation control circuit according to a second embodiment of the present invention.

FIG. 6 is a flow of processing to be implemented by the operation control circuit made in the form of a hardware. In response to the turning-on of the ignition switch, the operation control circuit waits continuously in the intact state while the operation command signal Sb is 0V (stop command) (step R1). If the operation command signal Sb varies to a pulse signal (serial operation command) or 5V (parallel operation command), the operation control circuit conducts the serial operation for a time period indicative of a start-up time period Td irrespective of the serial/parallel operation command (step R2), and after the completion of this serial operation, implements the parallel operation (steps R3 and R4) or the serial operation (steps R3 and R5) in accordance with the operation command signal Sb. The operation control circuit makes a decision as to whether or not the operation command signal Sb varies to 0V during these serial/parallel operations (step R6). If it does not reach 0V, the step R3 follows, and if it becomes 0V, the operational flow returns to the step R1.

Figure 7:
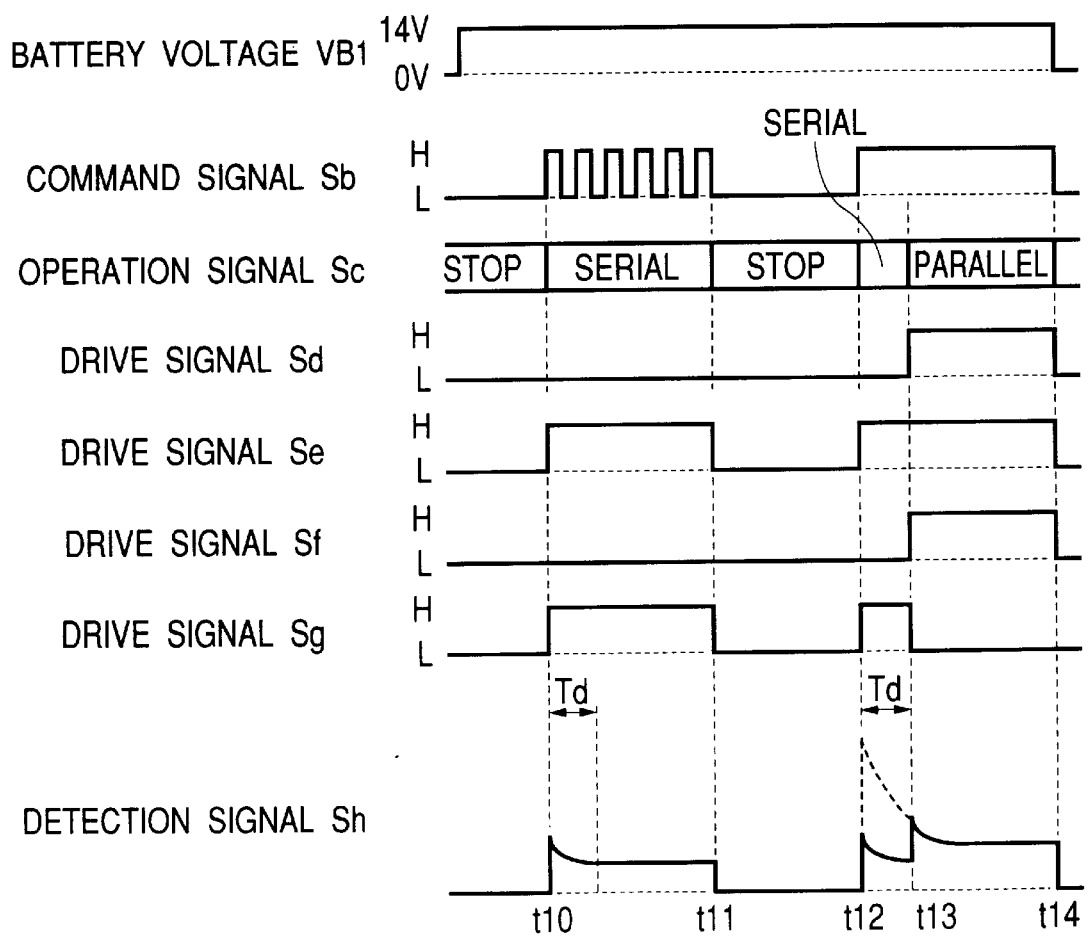
FIG. 7 is a timing chart of serial/parallel operations.

FIG. 7 is a timing chart showing the above-mentioned processing contents. After the turning-on of the ignition switch, when the operation command signal Sb indicates the serial operation at the time t10, the operation control circuit conducts the serial operation for a time period, including the aforesaid start-up time period Td, up to the time t11. On the other hand, when the command to the parallel operation is issued through the operation command signal Sb at the time t12, the operation control circuit once conducts the serial operation for a time period from the time t12 to the time t13 at which the start-up time period Td elapses and subsequently switches it to the parallel operation in accordance with the operation command signal Sb. In this case, the start-up time period Td is set to a time period (for example, 2 to 5 seconds) during which a current once increased lowers to the vicinity of the steady-state current.

Since no speed electromotive force develops in the fan motors 22 and 23 which is in the stopping condition, when a voltage is applied to the fan motors 22 and 23, a rush current larger than a current flowing in a steady state flows, and this rush current increases as the applied voltage becomes higher. In FIG. 7, the current detection signal Sh indicated by a broken line in the time period from the time t12 to the time t13 shows a current flowing in the case of the start-up in the parallel condition.

According to this embodiment, the operation control circuit conducts the serial operation for the start-up time period Td at the start-up regardless of the serial/parallel operation command based on the operation command signal Sb for generating a speed electromotive force and then performing the switching to the parallel operation in accordance with the operation command signal Sb, thus reducing the rush current at the start-up in comparison with the case of the start-up in the parallel condition. In consequence, it is possible to stem the drop of the battery voltages VB1 and VB2 at the start-up of the fan motors 22 and 23, thus reducing the influence of the power supply voltage variation on other devices working on the basis of the battery voltages VB1 and VB2.

(Third Embodiment)

Furthermore, referring to FIGS. 8 to 10, a description will be given hereinbelow of a third embodiment of the present invention.

Figure 8:
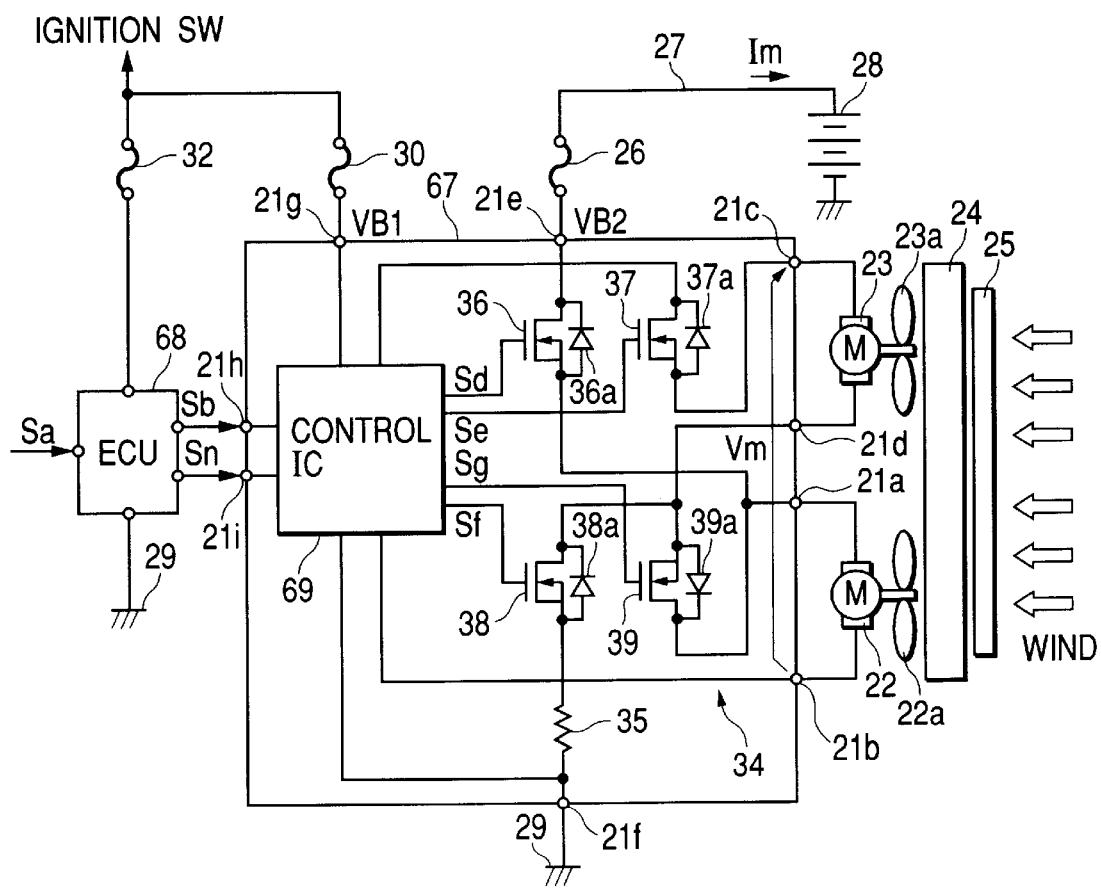
FIG. 8 is an illustration of an electric arrangement of a drive apparatus according to a third embodiment of the present invention and peripheral devices.

FIG. 8 is an illustration of an electric arrangement of a drive apparatus for fan motors and peripheral devices. In FIG. 8, the same reference numerals as those used above designate the same components. A drive apparatus 67, shown in FIG. 8, is equipped with an arrangement for regenerating generated energy of the fan motors 22 and 23 in a case in which the cooling fans 22a and 23a rotate while catching wind during running. An ECU 68 monitors the battery voltage VB1, and if the battery 28 is not in a fully charged condition and, for example, the vehicle speed exceeds 80 km/h, a power generation command signal Sn to be given to an terminal 21i of the drive apparatus 67 is set at 5V. Under conditions other than the aforesaid condition, the power generation command signal Sn is set at 0V.

A control IC 69 of the drive apparatus 67 operate the fan motors 22 and 23 as shown in FIG. 9 in accordance with a level of the power generation command signal Sn. That is, in a case in which the power generation command signal Sn assumes 0V, the same operation as that shown in FIG. 3 is conducted, and in a case in which the power generation command signal Sn is at 5V, a power generation operation is conducted when the battery voltage VB1$\geq$8V and the operation command signal Sb is at 0V. In this power generation operation, the control IC 69 sets a drive signal Sg to the step-up voltage Vcp (the battery voltage VB1 is also acceptable) and turns on only the MOS transistor 39.

When the vehicle runs and catches wind from the front side, the wind due to the running successively passes through the condenser 25 and the radiator 24 to contribute to the cooling thereof and then reaches the cooling fans 22a and 23a. If the cooling fans 22a and 23a receive a rotational force stemming from the wind due to the running, this rotational energy is converted into power generation energy as mentioned below. In the above-mentioned power generation operation, a current-carrying path is established which extends from the terminal 21f through the resistor 35, the fan motor 22, the MOS transistor 39, the fan motor 23 and the diode 37a to the terminal 21e, and the regeneration of the power generation energy from the fan motors 22 and 23 is made with respect to the battery 28 in a state where the fan motors 22 and 23 are connected in series. The reason that the fan motors 22 and 23 are connected in series is that there is a need to use a higher power generation voltage Vm for charging the battery 28.

Figure 10:
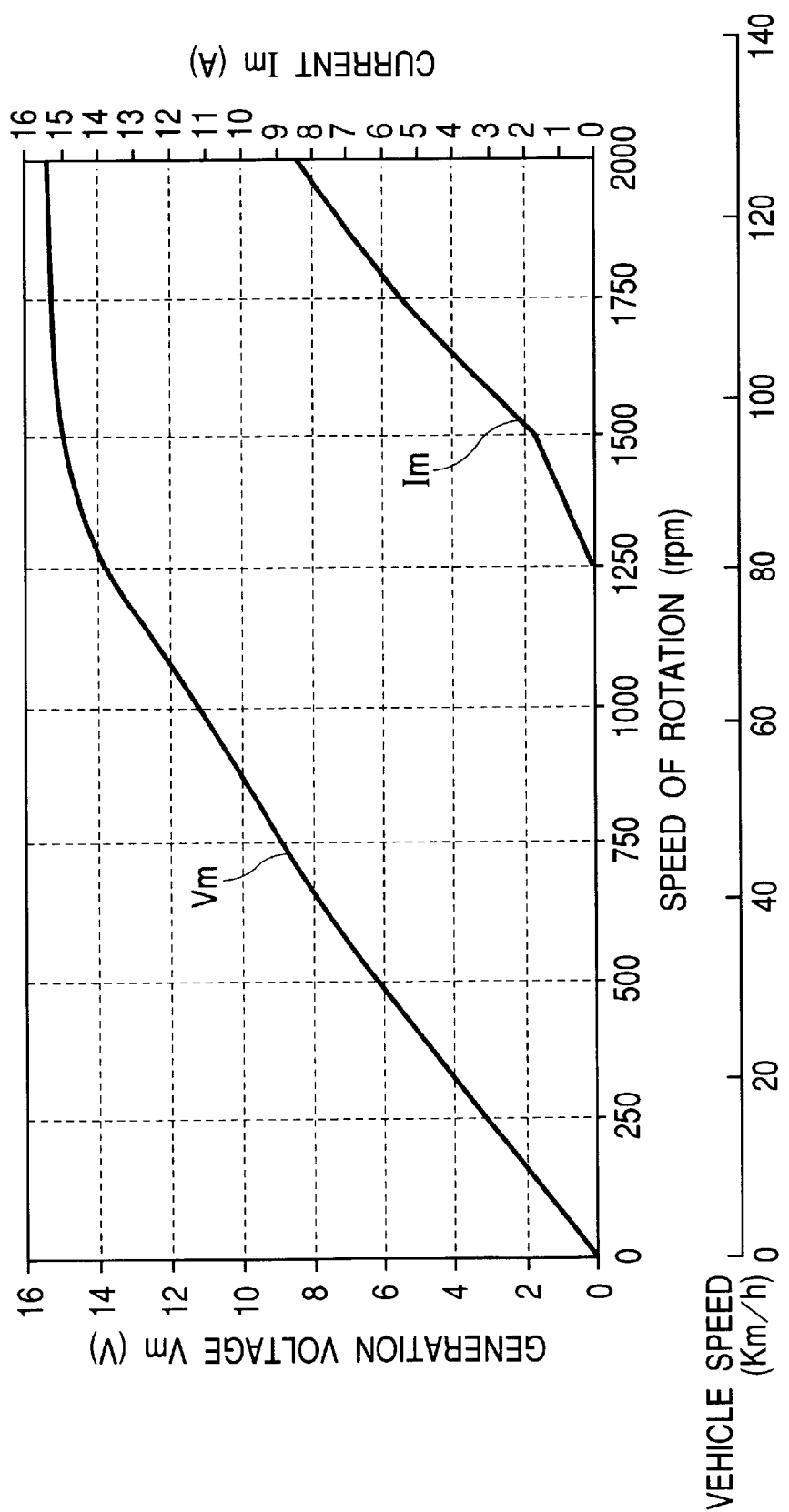
FIG. 10 is an illustration of a generated voltage Vm and a regenerative current Im with respect to a speed of rotation of a fan motor.

FIG. 10 is an illustration of characteristics of a power generation voltage Vm (V) and a regenerative current Im (A) relative to a speed of rotation of the fan motors 22 and 23, where the battery voltage VB2 (VB1) is at 14V. On the horizontal axis indicative of speeds of rotation, the corresponding vehicle speeds (km/h) are written additionally. The power generation voltage Vm between the terminals 21c and 21d rises at an approximately constant gradient as the vehicle speed increases and the speed of rotation of the fan motors 22 and 23 increases. In addition, when the power generation voltage Vm reaches the battery voltage VB2 (14V) at a vehicle speed of 80 km/h, the regenerative current Im starts to flow through the above-mentioned current-carrying path, and, thereafter, the power generation voltage Vm assumes an approximately constant value. The regenerative current Im increases as the vehicle speed increases and the speed of rotation of the fan motors 22 and 23 rises. The output of a power generation command from the ECU 68 when the vehicle speed exceeds 8-km/h is based on this power generation characteristic shown in FIG. 10.

As described above, the drive apparatus 67 according to this embodiment is designed to regenerate the power generation energy by connecting the fan motors 22 and 23 in series under the conditions that the battery 28 is not in the fully charged condition and the vehicle speed exceeds a predetermined value and the cooling fans 22a and 23a are rotating while catching wind due to the running of the vehicle, thus improving the power balance between the power generation and the power consumption in the vehicle and further charging the battery 28. In particular, since the vehicle is susceptible to stronger wind with the running unlike others catching natural wind, the cooling fans 22a and 23a catching the wind due to the running can easily attain their high rotation speed, thereby regenerating large power generation energy from the fan motors 22 and 23.

This embodiment can also offers the same effects of the first embodiment.

(Fourth Embodiment)

Still furthermore, referring to FIGS. 11A and 11B, a description will be given hereinbelow of a fourth embodiment of the present invention. A feature of the forth embodiment is the employment of an arrangement for protection against reverse connection of a battery in addition to the arrangement of the drive apparatus 21 shown in FIG. 1.

Figure 11A:
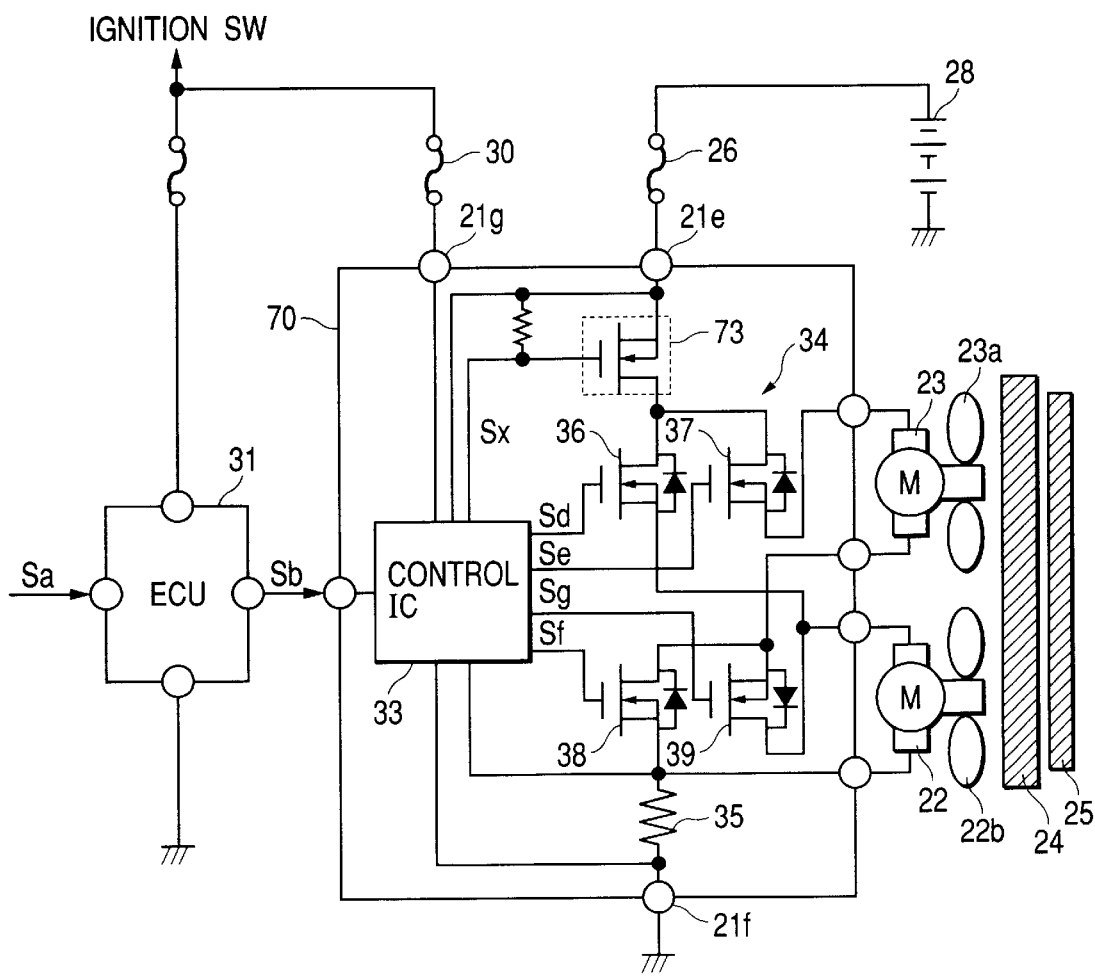
FIGS. 11A and 11B are illustrations of an electric arrangement of a drive apparatus according to a fourth embodiment of the present invention and peripheral devices.
Figure 11B:
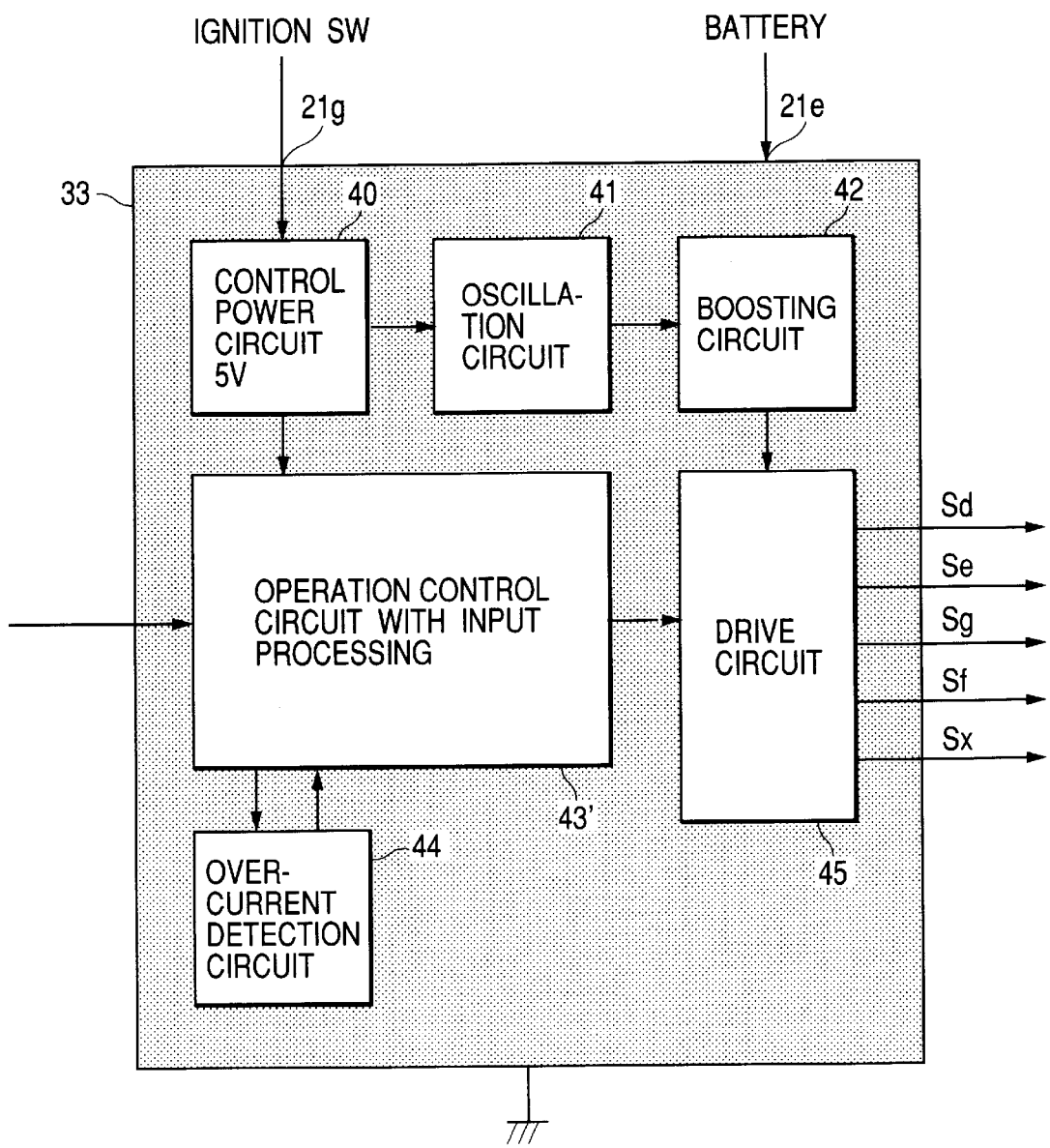
Figure 12:
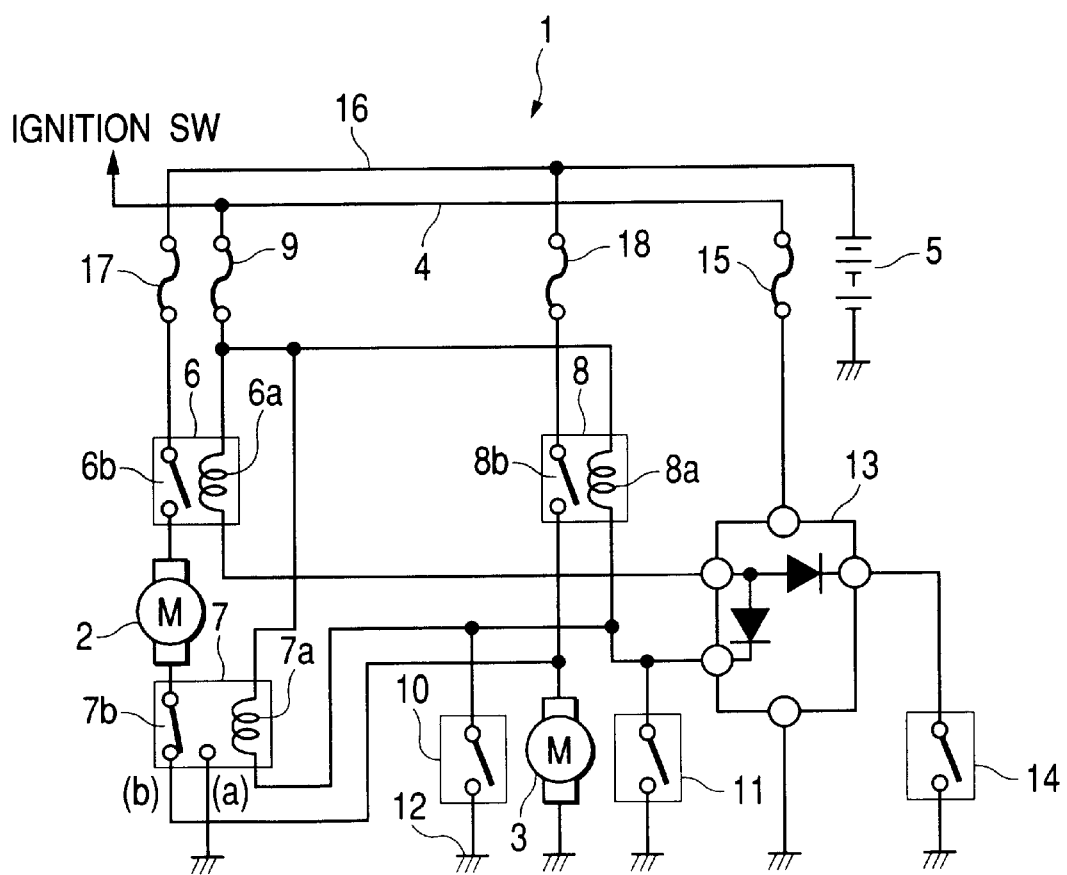
FIG. 12 is an illustration of an electric arrangement of a drive apparatus according to a conventional technique.

FIG. 11A is an illustration of an electric arrangement of a drive apparatus for fan motors and peripheral devices, and FIG. 11B is an illustration of an arrangement of a control IC of the drive circuit shown in FIG. 11B. In FIGS. 11A and 11B, the same reference numerals as those used above designate the same or corresponding components.

A drive apparatus 70, shown in FIG. 11A, comprises, in addition to the control IC 33, the switching circuit 34 and the current detection resistor 35, a reverse connection switch 73 which constitutes a battery reverse connection preventing means. Moreover, as shown in FIG. 11B, the control IC 33 is made up of, in addition to the control power supply circuit 40, the oscillation circuit 41, the boosting circuit 42, the overcurrent detection circuit 44 and the drive circuit 45, an operation control circuit 43' (corresponding to the operation control circuit 43 in the above-described first embodiment) with input processing means. The operation control circuit 43' with input processing means is connected to the terminal 21e coupled to the battery 28 in order to monitor the input (corresponding to the battery voltage) at the terminal 21e for outputting a signal Sx through the drive circuit 45 to the reverse connection switch 73 when needed (in the case of the occurrence of battery reverse connection).

The reverse connection switch 73, taking the on state in the normal condition (under the control of the control IC 33), is placed in any portion on the path extending from the battery 28 through the semiconductor switch 36, the semiconductor switch 39 and the semiconductor switch 38 to the ground. The reverse connection switch 73 is also connected to the control IC 33 to be operated in accordance with the signal Sx outputted from the control IC 33. That is, the operation control circuit 43' with input processing means makes a decision on the occurrence of the battery reverse connection on the basis of an input at the terminal 21e coupled to the battery 28. If a battery reverse connection occurs, the operation control circuit 43' outputs the reverse connection signal Sx through the drive circuit 45 to the reverse connection switch 73 so that the reverse connection switch 73 on the current-carrying path to the fan motors 22 and 23 is switched to the off state.

(Other Embodiments)

It should be understood that the present invention is not limited to the above-described embodiments shown in the illustrations, and that it is intended to cover all the following changes and modifications. For example, an arrangement based on a combination of the second and third embodiment is also acceptable, and the delay circuits 62 and 65 are also employable as needed. In addition, a brushless DC motor is also acceptable as the vehicle cooling fan motor, and an IGBT or a bipolar transistor is also acceptable as the foregoing semiconductor switches.

What is claimed is:

1. A cooling fan motor drive apparatus for use in vehicle which drives cooling fan motors upon receipt of a power supply voltage through power supply lines, comprising:

current-carrying switching means including first and second semiconductor switches interposed between a first power supply line and first and second cooling fan motors, a third semiconductor switch interposed between said second cooling fan motor and a second power supply line and a fourth semiconductor switch interposed between a first power supply line side terminal of said first cooling fan motor and a second power supply line side terminal of said second cooling fan motor; and control means for implementing control on openings and closures of said semiconductor switches so that said second and fourth semiconductor switches are closed when said first and second cooling fan motors are driven in series and said first, second and third semiconductor switches are closed when said first and second cooling fan motors are drive in parallel.

2. The apparatus according to claim 1, further comprising current detecting means for outputting a current detection signal corresponding to a current flowing in said first and second cooling fan motors, said control means including:

reference setting means for outputting a current reference signal corresponding to a reference current according to a condition of one of serial and parallel operation;

comparing means for comparing said current detection signal with said current reference signal to output a current-excess signal when said current detection signal exceeds said current reference signal; and operation switching means for conducting the switching from said parallel operation to said serial operation provided that said comparing means outputs said current-excess signal during said parallel operation.

3. The apparatus according to claim 2, wherein said comparing means is made to output said current-excess signal when said current detection signal continuously exceeds said current reference signal for over a predetermined time period.

4. The apparatus according to claim 2, wherein said operation switching means is made to conduct the switching to the condition of said serial or parallel operation before the output of said current-excess signal provided that said comparing means stops the output of said current-excess signal.

5. The apparatus according to claim 4, wherein said comparing means is made to stop the output of said current-excess signal when said current detection signal does not continuously exceed said current reference signal for over a predetermined time period.

6. The apparatus according to claim 1, wherein said control means is made to conduct said serial operation of said first and second cooling fan motors for a predetermined time period from start-up irrespective of a command on selection between said serial and parallel operations.

7. The apparatus according to claim 1, wherein reflux means is connected in parallel with each of said first to fourth semiconductor switches.

8. The apparatus according to claim 1, wherein said control means is made to, when said power supply voltage drops to be lower than a predetermined voltage, open said first to third semiconductor switches and close said fourth semiconductor switch for performing an operation for power regeneration from said cooling fan motors toward said power supply line side.

9. A cooling fan motor drive apparatus for use in vehicle which drives cooling fan motors upon receipt of a power supply voltage through power supply lines, comprising:

current-carrying switching means including first and second switches interposed between a first power supply line and first and second cooling fan motors, a third switch interposed between said second cooling fan motor and a second power supply line and a fourth switch interposed between a first power supply line side terminal of said first cooling fan motor and a second power supply line side terminal of said second cooling fan motor; and control means for implementing control on openings and closures of said first to fourth switches to establish first and second power supply systems between said first and second power supply lines for performing serial and parallel operations of said first and second cooling fan motors.

10. The apparatus according to claim 9, further comprising current detecting means for outputting a current detection signal corresponding to a current flowing in said first and second cooling fan motors, said control means including:

reference setting means for outputting a current reference signal corresponding to a reference current according to a condition of one of serial and parallel operation;

comparing means for comparing said current detection signal with said current reference signal to output a current-excess signal when said current detection signal exceeds said current reference signal; and operation switching means for conducting the switching from said parallel operation to said serial operation provided that said comparing means outputs said current-excess signal during said parallel operation.

11. The apparatus according to claim 9, wherein said second and fourth switches are closed when said first and second cooling fan motors are driven in series and said first, second and third switches are closed when said first and second cooling fan motors are drive in parallel.

12. The apparatus according to claim 10, wherein, when said current detecting means detects that the current flowing in said first and second cooling fan motors falls into an excessive condition, said control means controls said first to fourth switches to force said first and second cooling fan motors into said serial operation.

13. The apparatus according to claim 9, further comprising reverse connection switch means placed on said power supply systems so that, if reverse connection of a battery occurs, said control means detects the occurrence of the battery reverse connection on the basis of an input from said first power supply line and turns off said reverse connection switch.

14. The apparatus according to claim 9, wherein said control means is made to force said first and second cooling fan motors to operate in series for a predetermined time period from start-up irrespective of a command on selection between said serial and parallel operations.

* * * * *